US007817647B2

(12) United States Patent
Lieuallen et al.

(10) Patent No.: US 7,817,647 B2
(45) Date of Patent: Oct. 19, 2010

(54) FLOWER-PETAL RESOLUTIONS FOR PNRP

(75) Inventors: Brian R. Lieuallen, Redmond, WA (US); Noah Horton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1441 days.

(21) Appl. No.: 11/112,042

(22) Filed: Apr. 22, 2005

(65) Prior Publication Data

US 2006/0239197 A1  Oct. 26, 2006

(51) Int. Cl.
  *H04L 12/28* (2006.01)
(52) U.S. Cl. ................................................... 370/401
(58) Field of Classification Search ................. 370/331, 370/352, 401; 709/220; 455/436
  See application file for complete search history.

(56) References Cited

U.S. PATENT DOCUMENTS

| 4,874,963 | A  | 10/1989 | Alspector |
| 5,025,491 | A  | 6/1991  | Tsuchiya et al. |
| 5,293,457 | A  | 3/1994  | Arima et al. |
| 5,666,486 | A  | 9/1997  | Alfieri et al. |
| 5,671,279 | A  | 9/1997  | Elgamal |
| 5,793,365 | A  | 8/1998  | Tang et al. |
| 5,832,514 | A  | 11/1998 | Norin et al. |
| 5,933,849 | A  | 8/1999  | Srbljic et al. |
| 5,987,376 | A  | 11/1999 | Olson et al. |
| 5,999,711 | A  | 12/1999 | Misra et al. |
| 6,046,833 | A  | 4/2000  | Sharma et al. |
| 6,061,794 | A  | 5/2000  | Angelo et al. |
| 6,069,896 | A  | 5/2000  | Borgstahl et al. |
| 6,081,845 | A  | 6/2000  | Kanemaki et al. |
| 6,134,550 | A  | 10/2000 | Van Oorschot et al. |
| 6,167,438 | A  | 12/2000 | Yates et al. |
| 6,269,099 | B1 | 7/2001  | Borella et al. |
| 6,304,913 | B1 | 10/2001 | Rune |
| 6,480,473 | B1 | 11/2002 | Chambers et al. |
| 6,513,062 | B1 | 1/2003  | Weber |
| 6,532,217 | B1 | 3/2003  | Alkhatib et al. |
| 6,532,494 | B1 | 3/2003  | Frank et al. |
| 6,636,854 | B2 | 10/2003 | Dutta et al. |
| 6,683,865 | B1 | 1/2004  | Garcia-Luna-Aceves et al. |
| 6,725,281 | B1 | 4/2004  | Zintel et al. |

(Continued)

FOREIGN PATENT DOCUMENTS

EP  1487180 A2  12/2004

(Continued)

OTHER PUBLICATIONS

"Explorations in Parallel Distributed Processing," McClelland et al., The Massachusetts Institute of Technology, 1988.

(Continued)

*Primary Examiner*—Ricky Ngo
*Assistant Examiner*—Chandrahas Patel

(57) ABSTRACT

The claimed process and system provides a resolution process for a multi-level cache resolution protocol that involves a lookup procedure whereby the initiating node contacts each intermediate node directly using a communication link separate from any previous intermediate node. The resolution process may involve caching information from each contacted intermediate node during the resolution process to request leads on the target node in the form of a list of closer nodes known to the intermediary node.

18 Claims, 7 Drawing Sheets

U.S. PATENT DOCUMENTS

| | | |
|---|---|---|
| 6,765,896 B1 | 7/2004 | Ahmed et al. |
| 6,779,004 B1 | 8/2004 | Zintel |
| 6,892,230 B1 | 5/2005 | Gu et al. |
| 6,912,622 B2 | 6/2005 | Miller |
| 6,941,366 B2 | 9/2005 | Antes et al. |
| 6,941,384 B1 | 9/2005 | Aiken, Jr. et al. |
| 7,023,814 B2 * | 4/2006 | Kotzin .................. 370/312 |
| 7,031,314 B2 | 4/2006 | Craig et al. |
| 7,042,879 B2 * | 5/2006 | Eschbach et al. ........... 370/392 |
| 7,051,102 B2 | 5/2006 | Gupta et al. |
| 7,051,109 B1 * | 5/2006 | Stewart et al. ............. 709/230 |
| 7,065,587 B2 | 6/2006 | Huitema et al. |
| 7,120,146 B2 * | 10/2006 | Suzuki et al. .............. 370/390 |
| 7,185,194 B2 | 2/2007 | Morikawa et al. |
| 7,206,862 B2 | 4/2007 | Wheeler |
| 7,251,694 B2 | 7/2007 | Gupta et al. |
| 7,299,351 B2 | 11/2007 | Huitema et al. |
| 7,328,280 B2 * | 2/2008 | Takeda et al. .............. 709/245 |
| 7,333,482 B2 | 2/2008 | Johansson et al. |
| 7,418,479 B2 | 8/2008 | Gupta et al. |
| 7,444,372 B2 | 10/2008 | Gupta et al. |
| 7,463,637 B2 * | 12/2008 | Bou-Diab et al. .......... 370/401 |
| 7,533,184 B2 | 5/2009 | Miller et al. |
| 7,565,432 B2 | 7/2009 | Huitema et al. |
| 7,720,962 B2 | 5/2010 | Gupta et al. |
| 2002/0027569 A1 | 3/2002 | Manni et al. |
| 2002/0080752 A1 | 6/2002 | Johansson et al. |
| 2002/0112058 A1 | 8/2002 | Weisman et al. |
| 2002/0133500 A1 | 9/2002 | Arlein et al. |
| 2002/0143989 A1 | 10/2002 | Huitema et al. |
| 2002/0156875 A1 | 10/2002 | Pabla |
| 2003/0018813 A1 | 1/2003 | Antes et al. |
| 2003/0037178 A1 | 2/2003 | Vessey et al. |
| 2003/0041141 A1 | 2/2003 | Abdelaziz et al. |
| 2003/0055892 A1 | 3/2003 | Huitema et al. |
| 2003/0056093 A1 | 3/2003 | Huitema et al. |
| 2003/0056094 A1 | 3/2003 | Huitema et al. |
| 2003/0097410 A1 | 5/2003 | Atkins et al. |
| 2003/0097425 A1 | 5/2003 | Chen |
| 2003/0117433 A1 | 6/2003 | Milton et al. |
| 2003/0158839 A1 | 8/2003 | Faybishenko et al. |
| 2003/0196060 A1 | 10/2003 | Miller |
| 2003/0204626 A1 | 10/2003 | Wheeler |
| 2003/0204742 A1 | 10/2003 | Gupta et al. |
| 2003/0217140 A1 | 11/2003 | Burbeck et al. |
| 2004/0111469 A1 | 6/2004 | Manion et al. |
| 2004/0148333 A1 | 7/2004 | Manion et al. |
| 2004/0249907 A1 | 12/2004 | Brubacher et al. |
| 2004/0255029 A1 | 12/2004 | Manion et al. |
| 2004/0260800 A1 | 12/2004 | Gu et al. |
| 2005/0004985 A1 | 1/2005 | Stochosky |
| 2005/0022210 A1 | 1/2005 | Zintel et al. |
| 2005/0074018 A1 | 4/2005 | Zintel et al. |
| 2005/0097503 A1 | 5/2005 | Zintel et al. |
| 2005/0157659 A1 | 7/2005 | Huitema et al. |
| 2005/0216556 A1 | 9/2005 | Manion et al. |

FOREIGN PATENT DOCUMENTS

| | | |
|---|---|---|
| JP | 8263413 A | 10/1996 |
| JP | 9266475 A | 10/1997 |
| JP | 11004261 A | 5/1998 |
| JP | 10243021 A | 9/1998 |
| JP | 2000216827 A | 8/2000 |
| JP | 2000287021 A | 10/2000 |
| JP | 2001053806 A | 2/2001 |
| JP | 2001-526814 A | 12/2001 |
| JP | 2001-502494 A | 2/2002 |

OTHER PUBLICATIONS

"Peer-to-Peer Infrastructure: PeerGroupEnumMembers," Microsoft, http://msdn.microsoft.com/library/en-us/p2psdk/p2p/peergroupenummembers.asp?frame=true.

"Distributed hash table," http://en.wikipedia.org/wiki/Distributed_hash_table (Mar. 2006).

Dabek, F., et al., "Vivaldi: A Decentralized Network Coordinate System," SIGCOMM 2004, Aug. 2004.

Ng, T.S., et al., "Predicting Internet Network Distance with Coordinates-Based Approaches," INFOCOM'02, New York, NY, Jun. 2002.

"Genetic algorihm," http://www.google.com/search?sourceid-navclient&ie-UTF-88,rls-GGLG,GGLG:2005-3 (Mar. 2006).

Ng, T.S., et al., "Global Network Positioning: A New Approach to Network Distance Prediction," Student Poster, SIGCOMM'01, San Diego, CA Aug. 2001.

"Artificial Neural Network," Wikipedia Encyclopedia, http://en.wikipedia.org/wiki/Artificial_neural_network (Mar. 14, 2006).

Ng, T.S., et al., "A Network Positioning System for the Internet," USENIX Annual Technical Conference 2004, Boston, MA, Jun. 2004.

Zhang et al. "Brushwood: Distributed Trees in Peer-to-Peer Systems" (Mar. 2006).

Ng, T.S., et al., "Towards Global Network Positioning," Extended Abstract, ACM SIGCOMM Internet Measurement Workshop 2001, San Francisco, CA, Nov. 2001.

"Peer-to-Peer Infrastructure: Creating a Group Chat Application," Microsoft, http://msdn.microsoft.com/library/en-us/p2psdk/p2p/creating_a_group_chat_application.asp....

"Latency," http://whatis.techtarget.com/definition/0,,sid9_gci212456,00.html (Mar. 2006).

Costa et al. "PIC: Practical Internet Coordinates for Distance Estimation," ICDCS 2004 (Mar. 2004).

Cox, R., et al., "Practical, Distributed Network Coordinates," HotNets Workshop, 2003.

"Peer-to-Peer Infrastructure: Identity Manager Functions," Microsoft, http://msdn.microsoft.com/library/en-us/p2psdk/p2p/identity_manager_functions.asp?frame.

"Neural Network," Wikipedia Encyclopedia, http://en.wikipedia.org/wiki/Neural_network (Mar. 16, 2006).

"Genetic algorithm," http://en.wikipedia.org/wiki/Genetic_algorithm (Mar. 2006).

"Peer-to-Peer Infrastructure: Grouping API Functions," Microsoft, http://msdn.microsoft.com/library/en-us/p2psdk/p2p/grouping_api_functions.asp?frame=true.

"The Cable Guy—Nov. 2003: Windows Peer-to-Peer Networking," Microsoft Technet, http://www.microsoft.com/technet/community/columns/cableguy/cg1103.mspx.

Wooyoung Kim et al: "A secure platform for peer-to-peer computing in the Internet", Proceeding of the 35th Annual Hawaii International Conference on System Sciences IEEE Comput. Soc Los Alamitos, CA, USA, Jan. 7, 2002, pp. 3948-3957.

Dabek F., et al.: "Building peer-to-peer systems with chord, a distributed lookup service", Hot Topics in Operating Systems, 2001, Proceedings of the Eighth Workshop on May 20-22, 2001, Piscataway, NJ, USA, IEEE, May 20, 2001, pp. 81-86.

Sameer Ajmani, et al.: "ConChord: Cooperative SDSI Certificate Storage and Name Resolution", First International Workshop on Peer-to-Peer Systems (IPTPS), [online] Mar. 7, 2002, pp. 141-154, MIT Faculty Club, Cambridge, MA, USA Retrieved from the Internet: URL:http://www.cs.rice.edu/Conferences/IPTPSO2/119.pdf> [retrieved on Jun. 9, 2005].

Druschel P. et al.: "PAST: a large-scale, persistent peer-to-peer storage utility", Proceedings Eighth Workshop on Hot Topics in Operating Systems IEEE Comput. Soc Loas Alamitos, CA, USA, 2001, pp. 75-80.

Chen R. et al.: "Poblano: A Distributed Trust Model for Peer-to-Peer Networks", Internet Citation, [Online] Jun. 1, 2001, Retrieved from the Internet: URL: http://www.jxta.org/project/www/docs/trust.pdf> [retrieved on Aug. 1, 2006].

Ion Stoica: "Chord: A Scalable Peer-to-Peer Lookup Service for Internet Applications", Proceedings of ACM SIGCOMM, Aug. 27, 2001-Aug. 31, 2001.

Lee S., "A Performance comparison study of ad hoc wireless multicast protocols" INFOCOM 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, vol. 2, Mar. 26, 2000, pp. 565-574.

Sit E. et al.: "Security Considerations for Peer-to-Peer Distributed Has Tables", Proceedings of the First International Workshop on Peer-to-Peer Systems (IPTPS02), [online] Mar. 7, 2002, Cambridge, MA Retrieved from the Internet: URL: http://pdos.csail.mit.edu/chord/papers/sec.pdf> [retrieved on Jun. 8, 2005].

Hu Y.-C., et al.: "Ariadne: A secure on-depand routing protocol for ad hoc networks", Tech. Rep. TR01-383, [online] Mar. 22, 2002, Department of Computer Science, Rice University, Retrieved from the Internet: URL: http://www.cs.huji.ac.il/labs/danss/sensor/adhoc/routing/hu_2001ariadne-techreport.ps> [retrieved on Nov. 18, 2009].

Yi S., et al.: "Security Aware Ad Hoc Routing for Wireless Networks", Annual Workshop on Mobile and Ad Hoc Networking and Computing. MOBIHOC, XX, XX, Oct. 1, 2001, pp. 1-4.

Iyer R., et al.: "Overload Control Mechanisms for Web Servers", Workshop on Performance and QOS of Next Generation Networks, [online] 2000, pp. 225-244, Retrieved from the Internet: URL: http://citeseerx.ist.psu.edu/viewdoc/download?doi=10.1.1.20.8263&rep=rep1&type=pdf> [retrieved on Nov. 20, 2009].

Marti S., et al.: "Mitigating routing misbehavior in mobile ad hoc networks", MOBICOM 2000. Proceedings of the Sixth Annual International Conference on Mobile Computing and Networking ACM New York, NY, USA, 2000, pp. 255-265.

Red-Black Tree, National Institute of Standards and Technology, at http://www.nist.gov/dads/HTML/redblack.html (Mar. 5, 2002). cited by other.

Lai, K. et al., Measuring Link Bandwidths Using a Deterministic Model of Packet Delay, at Department of Computer Science at Stanford University, 13 pages. cited by other.

Ellison, C., B. Frantz, B. Lampson, R. Rivest, B. Thomas, and T. Ylonen, SPKI Certificate Theory, (The Internet Society 1999), at http://www.ietf.org/rfc/rfc2693.txt?number=2693 (last visited Aug. 6, 2001). cited by other.

Rowstron et al., Pastry: Scalable, distributed object location and routing for large-scale peer-to-peer systems, at Microsoft Research, Ltd., St. George House and Rice University, 20 pages. cited by other.

Rowstron et al., SCRIBE: The design of a large-scale event notification infrastructure, at Microsoft Research, Ltd., St. George House and Rice University, 20 pages. cited by other.

Rowstron et al., Storage management and caching in PAST, a large-scale, persistent peer-to-peer storage utility, at Microsoft Research, Ltd., St. George House and Rice University, 14 pages. cited by other.

"Arel Spotlight Application Suite," 11 pages. printed Jul. 1, 2005 from http://www.arelcom.com/conferencing.html. cited by other.

"FVC Launces Click to Meet Express 2.0," The Wainhouse Research Bulletin, Apr. 22, 2003, vol. 4, #17 (3 pages). cited by other.

"Live Meeting Overview," 3 pages printed Jul. 1, 2005 from <http://www.microsoft.com/office/livemeeting/prodinfo/overview.mspx>- ;. cited by other.

"SAIC Collaboration System: Knowledge Through Distributed Interaction," 8 pages printed Jul. 1, 2005 from <http://www.saic.com/products/software/collaboration/scs.pdf>. cited by other.

Langley, A., The Freenet Protocol, The Free Network Project, at http://freenet.sourceforge.net/index/php? page=protocol (May 21, 2001). cited by other.

"Collaborative Program Management for the 21st Century Enterprise," Paragon Dynamics, 4 pages printed Jul. 5, 2005 from <http://www.paragondynamics.com/dynamic/marketing/> Pace Feature.sub.--3.sub.--single.sub.--page.pdf. cited by other.

Bit Torrent; "What is BitTorrent?" Copyright 2001-2005 BitTorrent, Inc. cited by other.

Microsoft Corporation; "Introduction to Windows Peer-to-Peer Networking," Published: Jan. 2003. cited by other.

Ion Stoica, Robert Morris, David Karger, M. Frans Kaashoek, and Hari Balakrishnan; A Scalable Peer-to-Peer Lookup Service for Internet Applications; MIT Technical Report; Mar. 23, 2001; http//www.Ics.mit.edu/publictions/pubs/ps/MIT-LCS-TR-819.ps>. cited by other.

John Morris; Data Structures and Algorithms—Section 8.3; Online Publication 1998; http://ciips.ee.uwa.edu.au/{morris/Year2/PLDS210/hash.sub.--tables.html&g- t; : Aug. 8, 2005. cited by other.

Minami, et al., "The Design of Service Synthesizer on the Net", Technical Report of the Institute of Electronics, Information and Communication Engineers. SSE2000-236, IN2000-192(Mar. 2001), pp. 1-10. Accompanied with English Translation. cited by other.

Oram Andy (Ed); Peer-to-Peer: Harnessing the Benefits of a Disruptive Technology Passage; Peer-to-Peer: Harnessing the Benefits of a Disruptive Technology; Mar. 15, 2001; pp. 94-122. cited by other.

Prior Art Literature 2, Kamimura, et al., "Gnutella, rediscovering the potential of the Internet" 2000-EIP-9, pp. 33-40. Accompanied with English Translation. cited by other.

Scholl: Napster Messages; Internet Citation; Apr. 7, 2000. cited by other.

Partial European Search Report; EP 02 00 5770; Mar. 27, 2005; cited by other.

Partial European Search Report for EP 03 00 7907, dated Jun. 21, 2005. cited by other.

European Search Report; EP 02 00 5770; Munich; Aug. 9, 2005; cited by other.

European Search Report, Application No. EP 03 00 7907, Edy, Munich, Nov. 23, 2009. cited by other.

International Search Report; Application No. PCT/US06/15049; Alexandria, Virginia; Aug. 20, 2007.

\* cited by examiner

FLOWER-PETAL RESOLUTIONS FOR PNRP

FIELD OF THE INVENTION

The present invention relates generally to name resolution protocols, and more particularly relates to peer-to-peer name resolution protocols.

BACKGROUND

Peer to peer communications may depend on establishing connections between selected entities in a mesh, or network. Entities may have one or several addresses. Because the topology changes, these addresses may often vary as the entities move in the network. A classic architectural solution to this addressing problem is to assign to each entity a stable name, and to "resolve" this name when a connection is needed. This name to address translation must be robust, and must also allow for easy and fast updates.

Existing serverless name resolution protocols may use multi-level caches that resolve a name to a node ID by using a linear door-to-door approach in which a resolution message is sent from one node to another, each node directing the message to a known node closer to the target, until the target node is finally reached. In this process, each intermediate node may return an acknowledgement message to the initiating node via the established resolution path. The resolution message may be carried contemporaneously through the creation of the resolution path and may be delivered to the target node to verify the existence of the target node.

Because the message may be transferred through a set of intermediate nodes that make up the resolution path, there may be a potential for compromise. This may happen intentionally, such as when there exists a malicious node, or unintentionally. Also, because the message handling is entrusted to a series of nodes, it may be difficult, if not impossible, to ascertain whether a message is still in transit or has failed, and thus monitoring of message transmission is difficult. Further, because the series of nodes may be numerous, network traffic due to resolution messages may overly burden the network.

Therefore, a more secure and efficient name resolution procedure may be needed for server-less, multi-level cache name resolution protocols.

SUMMARY

The claimed process and system provides a resolution process for a multi-level cache resolution protocol that involves a lookup procedure whereby the initiating node contacts each intermediate node directly using a communication link separate from any previous intermediate node. The resolution process may involve caching information from each contacted intermediate node during the resolution process to request leads on the target node in the form of a list of closer nodes known to the intermediary node.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
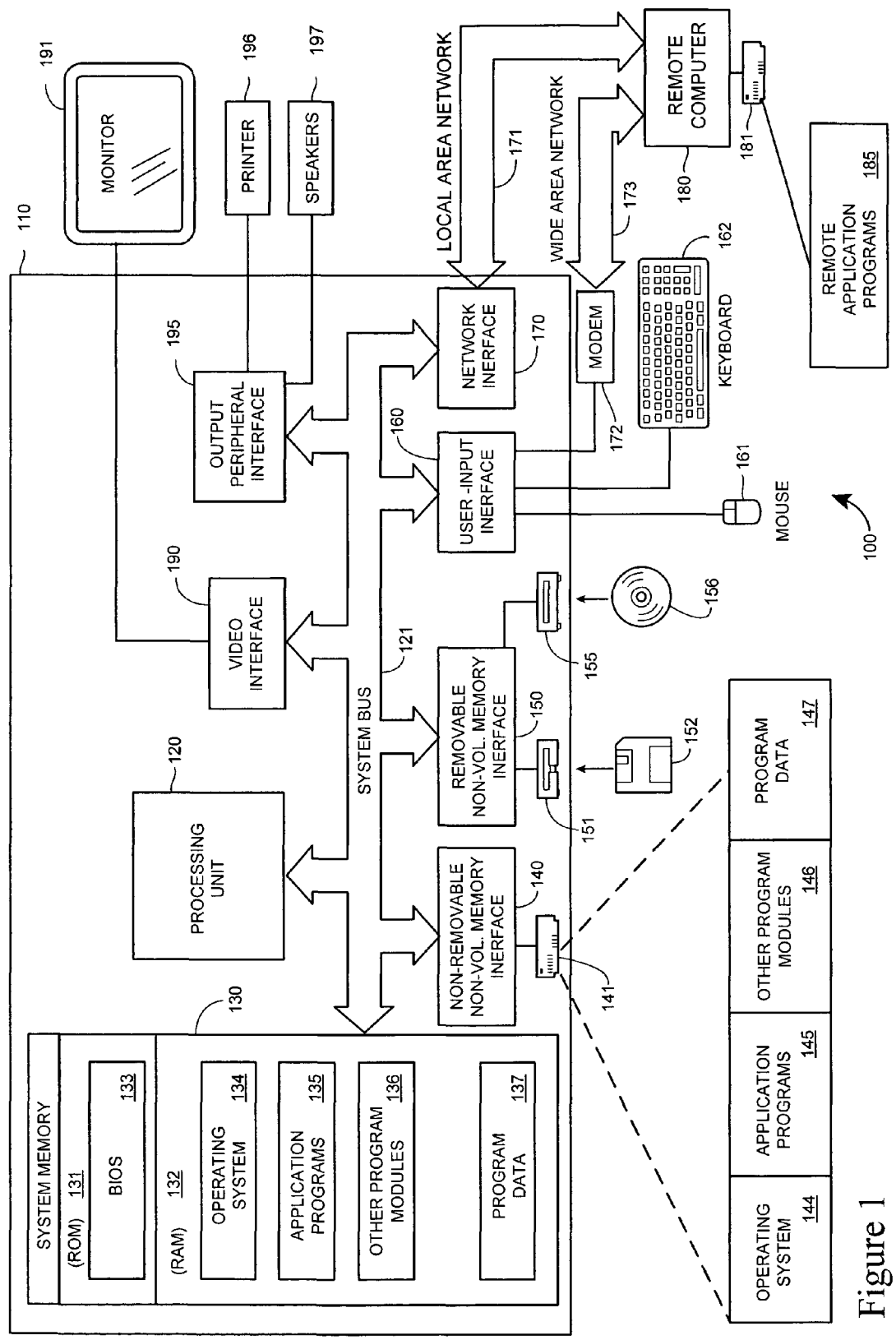
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A resolution procedure is the process by which a unique number, such as a name or identifier ("IDs"), gets resolved to an address. An existing server-less peer-to-peer name resolution protocol, such as Microsoft Peer Name Resolution Protocol ("PNRP") may involve a step-wise, door-to-door resolution procedure. In such a procedure, which may be illustrated in FIG. 2A, an initiating node attempts to resolve a target peer node ID by sending a lookup message which travels from node to node until the target ID may be found and resolved, in which case the resolution message may be carried along the door to door path and back during the resolution process. (This procedure is further described below.)

A possible peer-to-peer mesh, or network, may include a node that may be described by an address certificate, which may be called a certified peer address ("CPA"), a peer node identifier ("ID"), and key and signature information. The key and signature information may be used to prove that the node is a member of the peer-to-peer network, or mesh, and that the relation between the node and the.identifier is genuine. The format of the key and signature information may vary with implementation.

When an initiating node attempts communication with a target node, a resolution request message may first be created and sent through the mesh, and upon receiving a resolution response message containing a CPA for the resolved target peer ID, communication between the initiating node and target node may begin. The request message may contain a message code (e.g., REQUEST), a target node ID, the CPA of the initiating node, and an intermediary node list that contains and tracks each node that processed the resolution request, including information on the address of the intermediary node and an indication of whether the node accepted or refused the request. When the resolution request is initiated, the requesting node sets the message code, the target value, and the address certificate of the origin. The intermediate node list is initialized to contain exactly one entry with the address of the initiating node.

A response message may contain the message code, RESPONSE, the target node ID, the address certificate of the node that best matched the request, and a progress list that contains, for each node that processed the request and has not yet processed the response, the address of the node. Nodes get removed from the response list as the message makes its way back towards the initiating node, thereby providing a bread crumb path for the message to return by.

As discussed above, the query resolution procedure may be a process in which a unique number, representing a name or identifier, gets resolved to an address. In the case of a peer-to-peer network embodiment of the claims, the query resolution procedure may be a process in which a peer node ID, or peer ID, is resolved to a certified peer address ("CPA"). An existing peer-to-peer name resolution protocol may implement a resolution procedure as described below.

The initiating node that requests a resolution formats a request message, and forwards the message to a neighbor node having a peer ID numerically closest to the target peer ID being resolved. (This may be appropriate in meshes using a circular number system in which the numerical difference between two peer IDs of two peer nodes is representative of a distance between the two peer nodes.) When a node receives a request message, it first checks whether the certified peer address of the request message is valid. If the CPA is invalid, the request may be refused. If the intermediate node finds that the certificate is valid, the node may update its cache information with the address certificate. The CPA in the message may be for the nearest node currently found during the resolve process. As the request message gets forwarded along, the CPA may be updated. After checking the CPA, the intermediate node may then compare the target ID of the request to the local node ID. If the two values are identical, the final node has been found. The local node creates a resolution response message, places its own address certificate as the certificate of the best matching node, and returns the resolution response message back down the established resolution path using the intermediate node list.

If the target ID is not the local node ID, the cache of node IDs may be checked to determine if it contains an entry for the target node. If it does contain the target node ID, the intermediate node may forward the resolution message to that node. If it does not contain the target node information, the node may use its cache information to try to find a suitable next hop node whose address is not in the list of intermediate nodes. If there is a suitable next hop, the message may be relayed to that node and an entry may be added to the list containing the address of the intermediate node and an indication that the intermediate node accepted the query. However, if there is no suitable next hop, the entry corresponding to the intermediate node may be modified to indicate that the request was not accepted and relayed to the first entry that precedes the local node in the list of relays back down the resolution path. Even though the message may have been processed by the previous node, the request message may be processed again and the cache checked for any updates. If the message reaches the initiator of the request without being resolved, then the request may have failed.

When a node receives a response message, it first checks whether the CPA of the best match is valid. If the CPA is invalid, the response is refused. If the CPA is valid, the node updates its cache information with the address certificate of the best match. It then proceeds with the message according to the following steps. First, if the best match identifier is not equal to the target of the request, and if the local identifier is closer to the target than the best match identifier, the node replaces the best match certificate by the local certificate. Second, the intermediate node's entry is removed from the relay list. If the local node was the first entry in the relay list, e.g., if the local node is the origin of the request, then processing is complete. Otherwise, the message may be relayed to the first entry that precedes the local node in the list of relays and whose code indicates that it accepted the request. Thus, intermediate nodes do not need to keep state in order to execute this protocol. State may be maintained entirely using the resolution message.

Figure 2A:
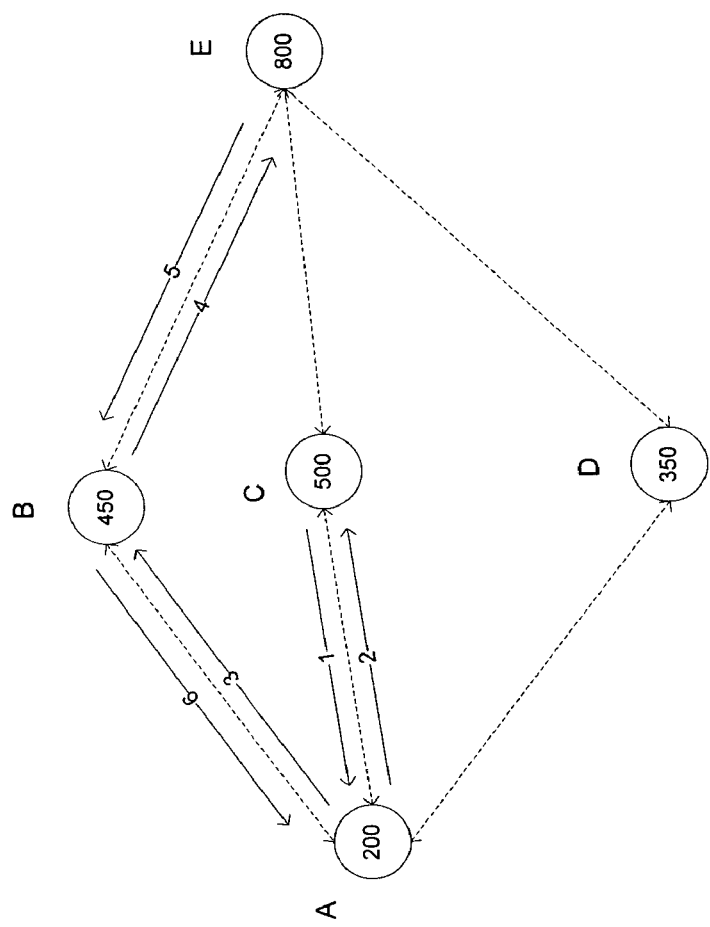
FIGS. 2A and 2B illustrates a partial view of amesh describing the process of constructing a general resolution path using an existing name resolution procedure.

FIG. 2A, illustrates a general resolution process as described above. (In the figure, the dotted line arrows from one node to another means that the connected nodes have cache entries for each other.)

If Peer A has entries for its own peer ID (200) and the peer ID of 450 and 500 and wants to resolve the peer ID of 800, the following process occurs. Because 500 is numerically closer to 800, Peer A sends a resolution message to the node that registered the peer ID of 500 (Peer C). Peer C does not have an entry for the peer ID of 800 and does not have any entries that are closer to 800. Peer C sends a response back to Peer A. Because 450 is the next numerically closer peer ID to 800, Peer A sends a peer resolution message to the node that registered the peer ID of 450 (Peer B). Peer B forwards the request to the address that registered the peer ID of 800 (Peer E). Although Peer B has an entry for Peer E in its cache, the existence of the cache entry does not assure that Peer E is currently available on the network. Peer E may then send a response back to Peer B. Peer B may send a response back to Peer A.

Figure 3:
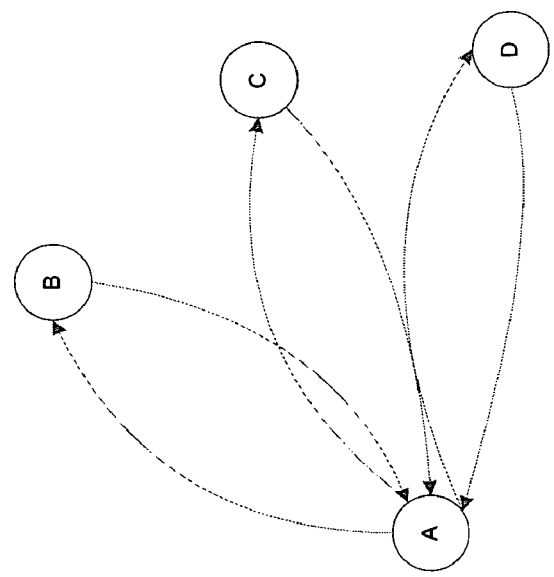
FIG. 3 illustrates a partial view of a mesh using a name resolution process in accordance with an embodiment of the claims.

The resolution process of the claimed method and system may be generally illustrated in FIG. 3 and described as follows. Node A begins a resolution request for node D. Node A creates a LOOKUP resolution message and may pass the message to the node in the system (B) that A knows that may be closest to the target. B receives the LOOKUP and determines that it is not the target node. B then checks its cache to determine a set of nodes that may be closer to the target D, where C may be a node in the system that it knows may be closest to the target. B sends an ANSWER message back to A. Node A sends a LOOKUP to C. C receives the LOOKUP and determines that it is not the target node. C then checks its cache to determine a set of nodes that may be closer to the target D, and finds that it has an entry for D, the target. C sends an ANSWER message back to A, with an entry for D. Node A sends a LOOKUP to D to verify its existence. Once D's existence is established, Node A may then establish a direct connection to node D. The resolution is successful and the resolution procedure is finished.

Generally, the claimed system maintains state on the initiating node and uses a LookUp resolution message and an Answer message to execute the resolution of the name resolution protocol. Instead of relying solely on the resolution messages to maintain state parameters for the resolution process, state may be maintained by the initiating node. In this manner, the initiating node is responsible for the resolution procedure and directly monitors each step of the resolution process.

Figure 4:
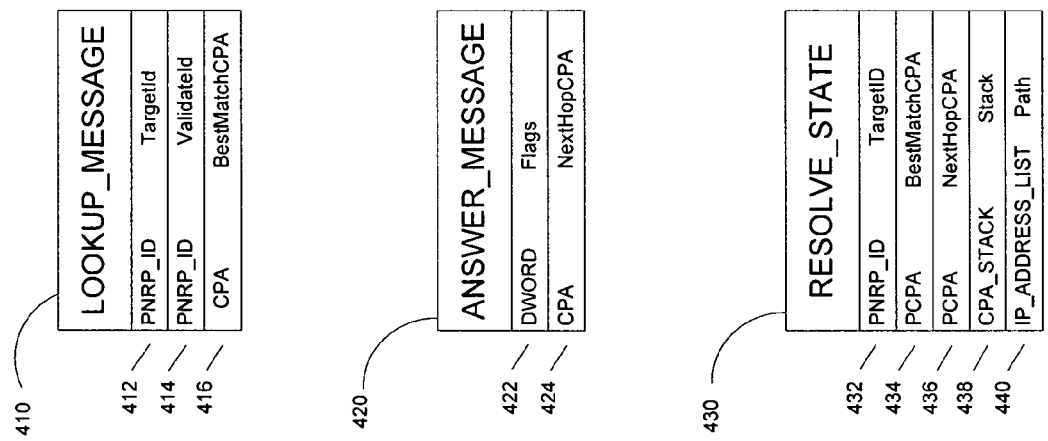
FIG. 4 illustrates a set of possible objects that may be used in the claimed process and system.
Figure 5:
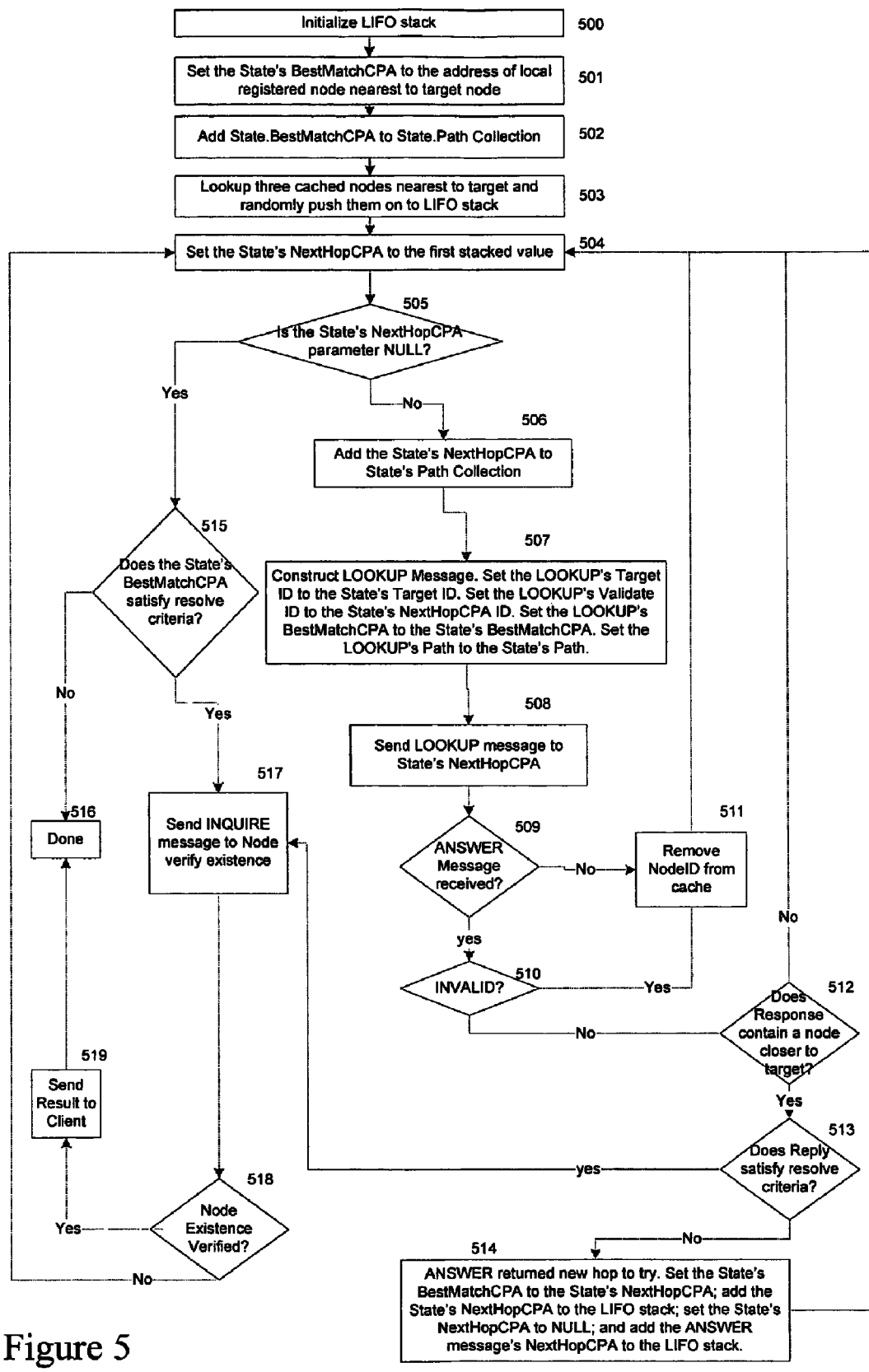
FIG. 5 illustrates a flow chart describing the handling process of an initiating node seeking to resolve a target peer ID and communicate with a target node in an embodiment of the claims.
Figure 6:
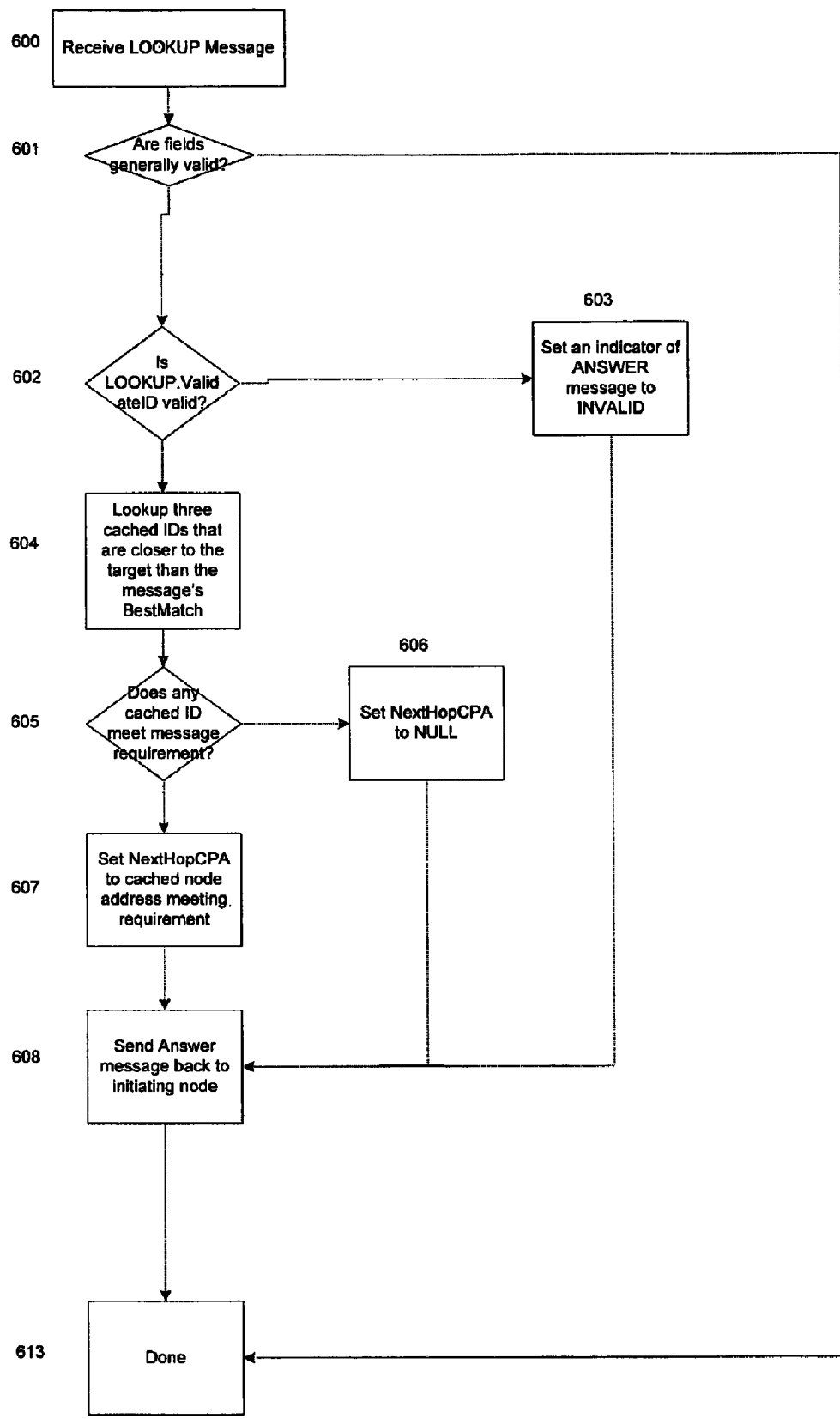
FIG. 6 illustrates a flow chart describing a receiving node handling a LOOKUP message received from an initiating node seeking to resolve a target peer ID.

An embodiment of the claimed process may be illustrated by FIGS. 4-6. Three objects may be used in the claimed resolution process, as illustrated in FIG. 4. A LookUp Message 410, may be used to initiate communication with intermediate nodes during a resolution process and may contain a target ID parameter 412, a validate ID parameter 414, and a best match CPA parameter 416. An Answer message object 420 may be used to deliver report information from an intermediate node during a resolution process and may contain a flags parameter 422 and a next hop CPA parameter 424. A resolve state object 430 associated with the initiating node may be used to maintain state at the initiating node and may include a target ID parameter 432, a best match CPA parameter 434, a next hop CPA parameter 436, a stack parameter 438, and a path parameter 440.

The logic flow of an initiating node is illustrated in FIG. 5 and will now be described. A last in, first out ("LIFO") stack parameter object may be initialized to keep track of any intermediate nodes traversed during the resolution process 500. The state parameter BestMatchCPA is initialized to the value of the nearest locally registered node ID 501. The initiating node's address may be added to the state parameter Path list 502. The cached CPA values for three nearest nodes may be pushed onto the LIFO stack 503. (The CPAs may be pushed onto the stack randomly.) A CPA entry from the top of the LIFO stack may be pulled and the state parameter NextHopCPA may be set to this pulled value 504.

At the next block 505, the state parameter NextHopCPA may be checked to determine if it has a non-Null value. If NextHopCPA value is not null, then the process may proceed to add the NextHopCPA address to the state parameter Path list 506 and construct a LookUp message 507. If the NextHopCPA value is Null, then there may be no further nodes to investigate. A check may be made to determine whether the State object's BestMatchCPA matches the resolve criteria. If BestMatchCPA does not match the resolve criteria, then the resolve procedure has failed and processing may be complete 516. If the State object's BestMatchCPA satisfies the resolve criteria, then an inquire message may be sent to the best match node 517 to determine if the node is in existence 518. If verified, then a resolved address may be sent to the client and the processing is complete 519. If the verification fails, then processing may return to block 505, where the next CPA entry may be pulled and processed.

The LookUp message may be initiated in block 507 by performing the following:

set the LOOKUP object's TargetId to the State object's Target ID;

set the LOOKUP object's ValidateId to the State object's NextHopCPA ID;

set the LOOKUP object's BestMatchCPA to the State object's BestMatchCPA; and set the LOOKUP object's Path list to the State object's Path list.

After constructing the LookUp message, the LookUp resolution message may be sent to the node corresponding to the NextHopCPA contained in the State object's NextHopCPA state parameter 508 and the process may then wait for an Answer message 509.

If a reply is unsuccessful or if an invalid flag is received 510, then the CPA contained in the NextHopCPA parameter may be removed from the cache 511 and the process may then attempt to process the next node CPA pulled from the stack 505. If a reply is received 509, 510, the process determines if the response contains information on a node closer to the target than the BestMatchCPA value 512. If a reply is received that does not contain a closer CPA than the BestMatchCPA, then the process checks the next CPA pulled from the stack 505. If the reply does contain a closer node, then the reply is checked to determine if the closer node information satisfies the resolve criteria 513. If the reply satisfies the resolve criteria, then an inquire message is sent to the BestMatchCPA to verify its existence and follows from block 517. If the reply does not satisfy the resolve criteria, then the state parameters of the initiating node are updated 514.

As illustrated in block 514, the BestMatchCPA is set to the state parameter's NextHopCPA, the state parameter's NextHopCPA is pushed on to the LIFO stack, the state parameter NextHopCPA is set to NULL, and the Answer message's NextHopCPA is pushed on to the LIFO stack. The process may then go back to block 505 and pull the next CPA from the stack to check its value.

The logic flow of a receiving or intermediate node will now be described, as illustrated in FIG. 6. When an intermediate node receives a LookUp message 600, the intermediate node may perform a general field validation 601. If the fields are invalid, the intermediate node will ignore the message and processing is done 613.

The intermediate receiving node may then check the ValidateId field 602, which may contain the node ID of the intermediate node. If the ValidateID field is invalid the intermediate node may create an Answer message having a flag of invalid 603, and send the Answer message back to the initiating node 608. If the ValidateID field is valid, then a search of the cache may be performed to find a set of IDs (e.g., three cache IDs) that are numerically closer to the target than the LookUp message's ValidateID 604. Block 605 determines whether there are any cached IDs closer than the BestMatchCPA. If no cached ID is closer, then the Answer message's NextHopCPA may be set to NULL 606 and sent back to the initiating node 608. Otherwise a randomly chosen ID from the retrieved set of cached IDs may be set as the Answer message's NextHopCPA 607. The Answer message may then be sent back to the initiating node 608.

Figure 7:
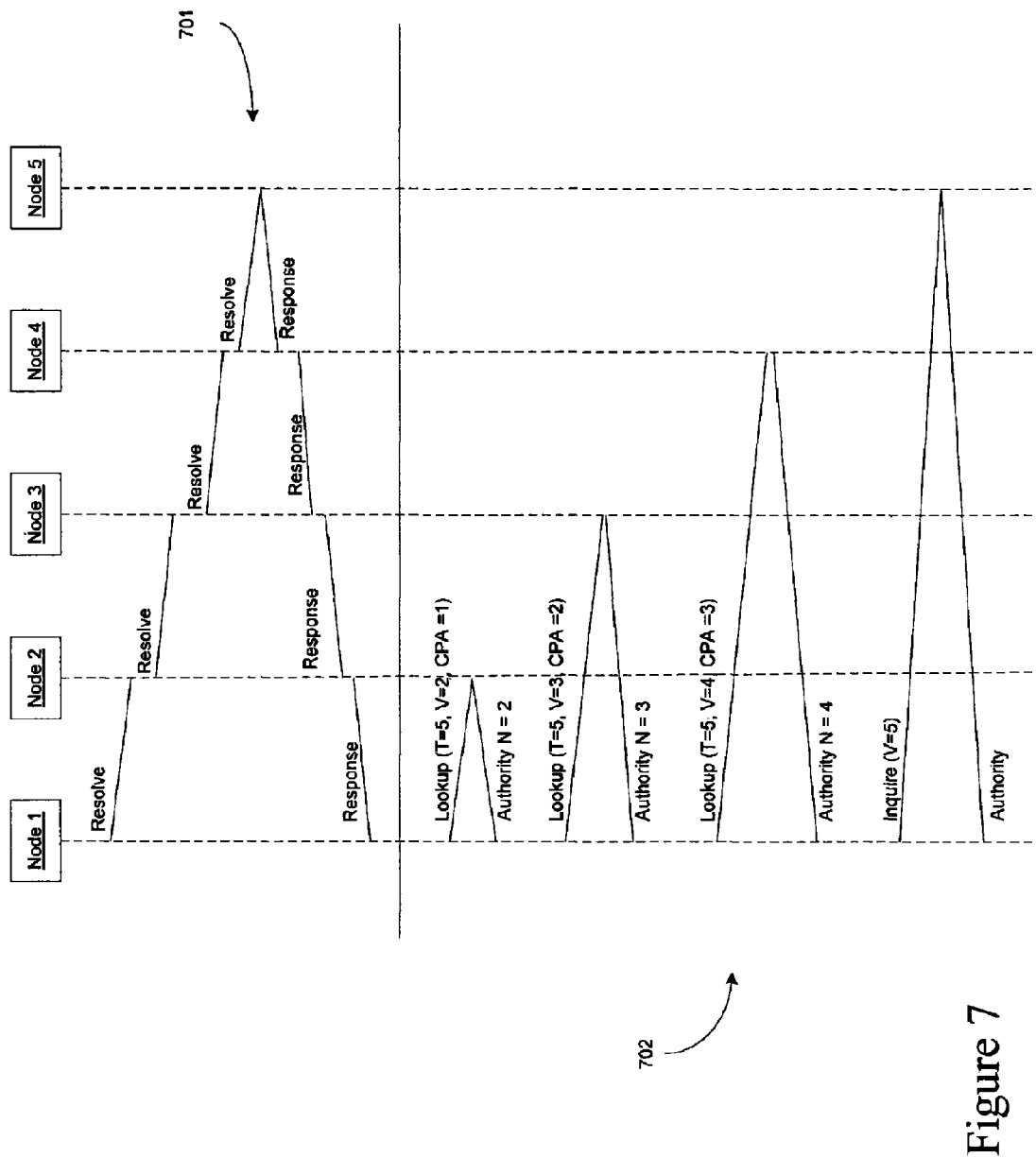
FIG. 7 illustrates a general flow diagram of an existing messaging process as well as the claimed messaging process.

FIG. 7, illustrates a comparison of the different message resolution processes. As illustrated in FIG. 7, an existing resolution process 701 may begin by Node 1 initiating a resolution request for Node 5. The resolution message may be passed to the node in the system that Node 1 knows that may be closest to the target, e.g., Node 2. Node 2 may then pass the request to the node in the system that it knows of that is closest to the target, e.g., Node 3. This may proceed until target Node 5 is reached, and subsequently, Node 5 may create a response message and return it down the established resolution path.

In an illustration of the claimed system and process 702, initiating Node 1 sends each of nodes 2, 3, and 4 separate LookUp messages and receives separate Authority messages, until Node 4 sends it the node address for Node 5. Node 1 then sends an Inquire message to Node 5 to confirm its existence before initiating any further communication with Node 5.

Figure 2B:
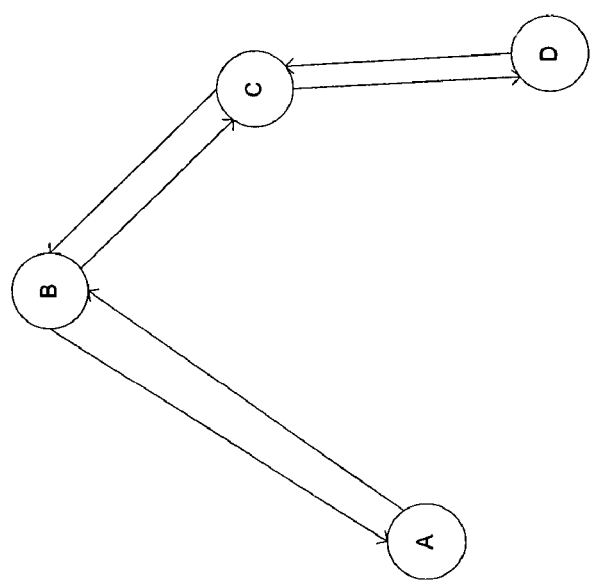

In the prior art process, the resolution may follow a door-to-door, or node-to-node, approach in which a resolution message is carried contemporaneously with the creation of the resolution path. Unless a node is a dead end, e.g., the node has no further leads, the resolve message will not return to the initiating node until a particular lead is exhausted. In the claimed system, the LookUp message always originates from the initiating node, thereby forming a flower petal pattern in which the message pathway always starts and ends at a center, e.g., the initiating node. See FIGS. 2B and 3. No intermediate node forwarding is involved in the actual communication of resolution messages.

Because each new node contacted during the resolution process is communicated with directly by the initiating node, there may be less chances of compromise by a malicious node. Moreover, direct responsibility is established between the initiating node and the target node, and thus the initiating node may locate the exact nature of any non-malicious resolution holdups, e.g., malfunctioning intermediary nodes.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments may be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A serverless peer-to-peer name resolution protocol through which unique numbers are resolved to addresses, comprising the steps of:

creating and initializing a node state object at an initiating node in an existing peer-to-peer mesh that keeps track of the state of a resolution process of the initiating node for establishing a direct connection, wherein the state object comprises information on a target node, a best match node, a next hop node, a path list, and a stack object;

creating a LOOKUP resolution message at the initiating node and sending the LOOKUP resolution message to an intermediate node in the existing peer-to-peer mesh;

receiving at the intermediate node a LOOKUP resolution message from the initiating node and determining whether the intermediate node contains information on a closer node to the target node than a node specified by the LOOKUP resolution message;

creating an answer message object at the intermediate node containing information on the closer node and sending the answer message to the initiating node in response to the LOOKUP resolution message object;

determining at the initiating node whether the closer node of the answer message matches a resolve criteria of the initiating node; establishing a direct connection between the initiating node and closer node based on the LOOKUP resolution message if the resolve criteria is matched; and changing the best match node to correspond to the intermediate node from which an answer message was received, adding the intermediate node from which an answer message was received on to the stack object, and adding the next hop node contained in the answer message to the stack object, when the answer message does not satisfy the resolve criteria.

2. The resolution protocol of claim 1, wherein the resolve criteria comprises whether the closer node of the answer message the target node.

3. The resolution protocol of claim 1, wherein the LOOKUP resolution message comprises information on a target node, an intermediate node ID, and a best match node.

4. The resolution protocol of claim 1, further comprising determining at the intermediate node whether the intermediate node ID contained in the LOOKUP resolution message matches the intermediate node ID and including in an answer message an invalid indicator when the unique number identifier contained in the LOOKUP resolution message does not match.

5. The resolution protocol of claim 4, further comprising determining at the initiating node whether an answer message contains an invalid indicator and removing node information corresponding to the intermediate node ID from the initiating node.

6. The resolution protocol of claim 1, wherein sending the LOOKUP resolution message object to an intermediate node comprises sending the LOOKUP resolution message object to an intermediate node closer to the target node than the initiating node.

7. The resolution protocol of claim 1, wherein closer comprises a closer numerical difference between node IDs in a circular number system.

8. The resolution protocol of claim 1, wherein sending the LOOKUP resolution message object to an intermediate node comprises sending the LOOKUP resolution message object to an intermediate node having an address corresponding to the intermediate node ID contained in the LOOKUP resolution message, and further comprising determining whether an answer message was received at the initiating node and removing node information corresponding to the intermediate node ID from the initiating node when no answer message is received.

9. The resolution protocol of claim 1, wherein determining whether the intermediate node contains information on a node closer to the target node than the initiating node comprises comparing a unique number identifier of the target node to a set of unique number identifiers stored at the intermediate node, and wherein creating an answer message object comprises providing address information of an intermediate node closer to the target node than the best match node of the LOOKUP resolution message.

10. The resolution protocol of claim 1, further comprising sending an inquire message to the closer node if the closer node matches the resolve criteria and providing an indication if the inquire message verifies the existence of the closer node.

11. A peer-to-peer computer mesh network comprising:
an initiating node attempting to resolve a unique number identifier to an address of a target node for the purpose of establishing a direction connection, wherein the initiating node contains a cache of local nodes and comprises a state object that keeps track of the state of a resolution process of the initiating node, the state object comprising information on a target node, a best match node, a next hop node, a path list, and a stack object;
a first intermediate node that is listed in the cache of the initiating node and is closer to the target node than the initiating node, wherein the initiating node contains a cache of local nodes;
wherein the initiating node sends a first LOOKUP resolution message to the first intermediate node when the initiating node does not have the target node address in its cache,
wherein the intermediate node receives a LOOKUP resolution message from the initiating node and returns an answer message to the initiating node with the address of a second intermediate node closer to the target node than the first intermediate node; and
wherein the initiating node establishes a direction connection to the target node if the resolve criteria is matched; and
changing the best match node to correspond to the intermediate node from which an answer message was received, adding the intermediate node from which an answer message was received on to the stack object, and adding the next hop node contained in the answer message to the stack object, when the answer message does not satisfy the resolve criteria.

12. The peer-to-peer computer mesh network of claim 11, wherein the initiating node sends the intermediate node an ID corresponding to the intermediate node in the LOOKUP resolution message and further wherein the intermediate node returns an answer message with an invalid indicator if the intermediate node ID of the LOOKUP resolution message does not match its ID.

13. The peer-to-peer computer mesh network of claim 11, wherein the initiating node sends an inquire message to the closer node address contained in the answer message if the closer node address corresponds to the target node ID.

14. The peer-to-peer computer mesh network of claim 11, wherein closer comprises a numerical difference between node IDs in a circular number system.

15. The peer-to-peer computer mesh network of claim 14, wherein the initiating node will send a second LOOKUP resolution message to the address of the second intermediate node contained in the answer message.

16. The peer-to-peer computer mesh network of claim 15, wherein the state object maintains a list of nodes traversed during the resolution process and further wherein the initiating node will send a third LOOKUP resolution message to the first intermediate node if the second intermediate node does not contain the address of a node closer to the target node.

17. The peer-to-peer computer mesh network of claim 11, wherein the intermediate node finds a plurality of entries in its cache with identifiers that are closest to the target node, randomly picks one of the plurality of entries, and returns the randomly picked entry in the answer message.

18. The peer-to-peer computer mesh network of claim 11, wherein the LOOKUP resolution message includes a certificate of origin, and further comprises checking the certificate of origin to determine its validity, and refusing the LOOKUP resolution message when the certificate of origin is invalid.

* * * * *